United States Patent

[11] 3,616,331

[72] Inventors Charles Edward O'Neill
Oakville, Ontario;
Alexander Illis, Mississaugua, Ontario;
David Anthony Huggins, Mississaugua, Ontario, all of Canada
[21] Appl. No. 835,797
[22] Filed June 23, 1969
[45] Patented Oct. 26, 1971
[73] Assignee The International Nickel Company, Inc.
New York, N.Y.
[32] Priority Aug. 3, 1968
[33] Canada
[31] 026,644

[54] RECOVERY OF NICKEL AND COPPER FROM SULFIDES
22 Claims, No Drawings
[52] U.S. Cl.................................................. 204/108,
23/125, 75/82, 75/101, 204/109, 204/112, 204/128
[51] Int. Cl........................................................ C22d 1/10,
C22b 23/06, C22b 3/00

[50] Field of Search............................................ 75/82, 101;
23/125; 204/108, 109, 112, 128

[56] References Cited
UNITED STATES PATENTS
3,004,846  10/1961  Queneau .................... 75/82
1,841,438  1/1932   Greenawalt ................. 204/108

*Primary Examiner*—John H. Mack
*Assistant Examiner*—R. L. Andrews
*Attorney*—Maurice L. Pinel ABSTRACT: The present invention is directed to the treatment of sulfide materials containing nickel and/or copper sulfide but substantially free of iron to recover the metal values as a sulfate solution and to liberate elemental sulfur wherein the metal sulfide is slurried in an aqueous sulfuric acid-iron sulfate leach solution and is then heated at a temperature range of about 80° C. to 150° C. under an oxygen partial pressure of at least about 2 atmospheres to dissolve the metal values and liberate elemental sulfur.

RECOVERY OF NICKEL AND COPPER FROM SULFIDES

The present invention relates to an improved process for treating materials containing nickel, copper and sulfur to recover each of these elements and more particularly to the recovery of nickel, copper and sulfur from ores, ore concentrates and metallurgical intermediates and crudes by a combination of pyrometallurgical and hydrometallurgical processes and vapometallurgical processes for high nickel-containing materials.

Ores, ore concentrates and metallurgical intermediates and crudes containing nickel, copper and sulfur have been and are being treated by pyrometallurgical, hydrometallurgical, vapometallurgical and electrochemical processes to recover nickel, copper and sulfur in commercial forms. Such prior processes also endeavored to provide a concentrate of precious metals, if present in the starting material, in order to facilitate the recovery of such precious metals. Although such prior and existing processes were and are effective in recovering nickel, copper, sulfur and the precious metals from the starting materials, such processes often entail large capital outlays, high labor costs and incomplete or ineffective recovery of one or the other values from the starting material. For example, the pyrometallurgical treatment of sulfide ores or ore concentrates containing nickel, cobalt, copper and the precious metals frequently involves the recirculation of uneconomically large quantities of slag or other smelter intermediates in order to insure high recoveries of metal values therefrom. A further example is the hydrometallurgical treatment of such materials which often involves the nonselective dissolution of nickel and copper such that the separation and recovery of the metal values are rendered difficult and expensive. Although attempts were made to overcome the foregoing difficulties and other disadvantages, none, as far as we are aware, was entirely successful when carried into practice commercially on an industrial scale.

It has now been discovered that sulfides of nickel and/or copper can be hydrometallurgically treated to provide solutions from which nickel and/or copper can be recovered and to produce elemental sulfur. This discovery is particularly applicable to integrated processes for recovering nickel and copper from ores, ore concentrates and metallurgical crudes and intermediates.

It is an object of the present invention to provide a process for hydrometallurgically treating nickel and/or copper sulfides to produce nickel and/or copper solutions and elemental sulfur.

It is an object of the present invention to provide a process for hydrometallurgically treating nickel and/or copper sulfides to produce nickel and/or copper solutions and elemental sulfur.

It is a further object of the invention to provide an integrated process for recovering nickel, copper and sulfur from materials containing the same.

It is also an object of the present invention to recover precious metals associated with nickel and/or copper sulfides.

It is an object of the present invention to provide a process for recovering nickel, copper and sulfur from starting materials containing the same by a combination of pyrometallurgical and hydrometallurgical processes.

Generally speaking, the present invention contemplates a process for treating substantially iron-free sulfides of at least one metal selected from the group consisting of nickel and copper to produce a sulfate solution of the metal and to liberate elemental sulfur. The metal sulfide, in finely divided form, is slurried in an aqueous solution, which solution contains at least about 2 grams per liter (g.p.l.) iron as iron sulfate and sulfuric acid at least in stoichiometric amounts to combine with the metal in the sulfide. The slurry is heated to a temperature between about 80° C. and 150° C. under an oxygen partial pressure of at least about 2 atmospheres (atm) to form a sulfate solution of the metal and to liberate elemental sulfur. It is advantageous to recover the metal from solution by electrolytic techniques so that sulfuric acid solution containing the iron can be regenerated and returned to the leaching operation.

The process of the present invention is advantageously employed in conjunction with prior processing techniques. A particularly advantageous embodiment of an integrated process involves the treatment of ores, ore concentrates and metallurgical crudes and intermediates which contain sulfur and at least one metal selected from the group consisting of nickel and copper by pyrometallurgical and/or vapometallurgical techniques which produce sulfide intermediate products of nickel and/or copper. As will be described hereinafter, such materials, either out of necessity or by design, are treated to remove iron so that in most instances the sulfide to be treated in accordance with the present invention will be substantially iron-free, i.e., the sulfide will contain no more than about 1 percent or 1.5 percent iron and advantageously no more than about 0.5 percent iron. An example of such an integrated process comprises providing a starting material in a drastically quenched state which contains copper and sulfur in amounts so that the copper to sulfur ratio is between about 3.5: 1 or 4: 1 and 10:1, nickel and controlled amounts or iron. The starting material is leached with an acidic aqueous solution containing copper sulfate in amounts at least stoichiometrically equivalent to the nickel, iron and cobalt contained in the starting material and sufficient sulfuric acid to maintain a pH value below about 5. Advantageously, the copper sulfate solution contains a stoichiometric excess of copper sulfate of up to about 20 percent in order to insure maximum dissolution of the nickel, iron and cobalt as sulfates. This leaching operation is conducted at a temperature between about 100° C. and 250° C. under the pressures generated at these temperatures. The residue obtained from this leaching operation contains substantially all the copper in the starting material as copper sulfide and cement copper and is substantially free of iron. After filtration, the filtrate is treated to recover nickel and the residue is treated to recover copper and sulfur. The copper-containing residue is leached with an acidic aqueous solution, which contains at least about 2 g.p.l. iron as iron sulfate and sulfuric acid in amounts of at least about the stoichiometric equivalent to the copper contained in the copper per residue (advantageously a stoichiometric excess of up to about 20 percent is employed), at a temperature between about 80° C. and 150° C. and at oxygen partial pressures between about 2 atm. and 20 atm. to dissolve substantially all the copper in the residue as copper sulfate and to liberate elemental sulfur. The copper sulfate solution is treated to recover copper. When the starting materials contain precious metals, the precious metals will be associated with the elemental sulfur and are recovered therefrom. The oxidative leaching operation will be described hereinafter in conjunction with the treatment of materials containing nickel, copper and sulfur in order to recover each of these elements.

Any nickel- and copper-containing material can be treated in accordance with the integrated process of the present invention. Thus, ores, ore concentrates and metallurgical intermediates and crudes, which contain nickel, copper and sulfur, can be treated by the process disclosed herein. Such materials can also contain cobalt and the precious metals which are also recovered. The terms "metallurgical intermediates" and "metallurgical crudes" include materials such as mattes, metal anode sludges, sulfide anode sludges, carbonyl residues, sulfided scrap and matte separation products. The starting material will generally have nickel to copper ratios between about 100:1 and 1:25. Materials having lower nickel to copper ratios can be treated by conventional copper practice.

When separating nickel from copper, either by leaching or by a combination of vapometallurgical techniques and leaching, the iron content in the starting material is controlled to be below about 2 percent, advantageously the iron content is lowered to less than about 0.5 percent. Lowering of the iron content to these limits is extremely important in providing efficient low-cost recovery of nickel and copper whether the initial separation is by the first stage leaching with the copper sulfate solution or by initial separation by vapometallurgical techniques as described hereinafter followed by a like leaching operation of the vapometallurgical residue. The starting material, if primarily sulfide in form, is smelted and treated with a free-oxygen-containing gas, e.g., air, oxygen-enriched air or commercial oxygen, to oxidize and remove substantially all the iron. The treatment with the free-oxygen-enriched air or commercial oxygen, to oxidize and remove substantially all the iron. The treatment with the free-oxygen-containing gas is continued to provide a molten bath with copper to sulfur ratios of at least about 3.5:1, advantageously the copper to sulfur ratio is controlled to be between about 4:1 and 10:1, and the molten bath is then drastically quenched by techniques such as shotting or granulation When the starting material contains sulfur in amounts insufficient to provide the aforementioned copper to sulfur ratios, the material can be melted and treated with a free-oxygen-containing gas to lower the iron content to below about 2 percent before adding a sulfur-bearing material to provide the desired copper to sulfur ratio or the sulfur-bearing material can be added prior to the treatment with the free-oxygen-containing gas.

When separating nickel from copper, as noted hereinbefore, the copper to sulfur ratio of starting material is pyrometallurgically adjusted to between about 4:1 and 10:1. Thus, it is seen that after the pyrometallurgical treatment the sulfur content of the bath is, in most instances, insufficient to form sizeable amounts of nickel sulfide upon solidification. This is an advantageous feature of the present invention since separation of nickel from copper is greatly enhanced by the presence of metallic nickel rather than nickel sulfide. However, the molten nickel-copper bath with the controlled sulfur content is advantageously drastically quenched in order to take full advantage of the controlled sulfur content. The instantaneous solidification obtained by drastic quenching insures substantially homogenous distribution of the sulfur throughout solidified material. Such uniform sulfur distribution promotes rapid and highly selective separation of nickel from copper by both hydrometallurgical and vapometallurgical techniques.

Whatever the nickel to copper ratio is in the drastically quenched material, it can be treated with an acid aqueous solution, which contains copper sulfate in amounts at least about stoichiometrically equivalent to the nickel, iron and cobalt contained in the starting material and sulfuric acid in amounts sufficient to maintain the solution at a pH below about 5, at a temperature between about 100° C. and 250° C. under the pressures generated at the corresponding temperatures to dissolve substantially all the nickel, cobalt and iron as sulfates and to provide a residue containing substantially all the copper both from the drastically quenched material and from the aqueous solution. Advantageously, the acidic aqueous solution contains copper sulfate in an excess amount of up to about 20 percent, e.g., about 10 percent, of the stoichiometric amount required to react with the nickel, iron and any cobalt contained in the solid and sulfuric acid in amounts sufficient to maintain the solution at a pH value between about 1 and 2 so that substantially all the copper in solution is cemented out or precipitated as copper sulfide while substantially all the nickel, iron and cobalt are brought into solution. It is to be noted that this leaching operation is conducted without any intentionally created partial pressure of oxygen other than the oxygen in the air entrapped in the leaching apparatus, e.g., an autoclave. The leaching conditions are such that in the absence of any artificially created oxygen partial pressures any iron present tends to go into solution with the nickel. Such iron is undesirable for at least two reasons. Firstly, the nickel-containing solution must be freed of the dissolved iron in order to obtain a purified nickel product, and secondly, as more iron goes into solution greater quantities of chemicals and larger capacity equipment are required. For the foregoing reasons it is essential to initially treat the starting material to lower the iron content to less than about 2 percent.

Although starting materials having nickel to copper ratios of as high as about 100:1 can be, after iron and sulfur adjustment and drastic quenching, treated by leaching to provide a nickel solution substantially free of copper, it is advantageous to treat the drastically quenched material by vapometallurgical techniques when the nickel to copper ratio exceeds about 1:2, advantageously nickel to copper ratios of about 1:1 or even higher. The vapometallurgical treatment comprises carbonylating the drastically quenched material with carbon monoxide partial pressures of at least about 5 atms. but less than about 100 atms. at a temperature between about 50° C. and 200° C. to form substantially pure nickel carbonyl. Higher and lower partial pressures of carbon monoxide can be employed but higher pressures require much heavier equipment with concomitant higher capital expenditures while lower pressures result in slower and less complete carbonylation. Advantageously, carbon monoxide partial pressures of between about 10 atms. and 60 atms. are employed to insure rapid and complete carbonylation while avoiding the use of heavier equipment. Control of the sulfur and iron contents and drastic quenching of a molten bath of such controlled composition is of the utmost importance when the carbonylation treatment is employed to effect an initial separation of nickel from copper. Control of the sulfur content and drastic quenching to uniformly distribute the sulfur provides an active metal product for carbonylation. If the drastically quenched material contains above about 2 percent iron, the recovery of nickel as nickel carbonyl rapidly falls to a point when the carbonylation treatment is rendered uneconomic. Starting materials, which have been drastically quenched and which have nickel to copper ratios of more than about 1:1, copper to sulfur ratios of between about 4:1 and 10:1 and less than about 2 percent iron, can be treated under the foregoing carbonylation conditions to provide nickel recoveries as substantially pure nickel carbonyl of more than about 80 percent, e.g., nickel recoveries of about 90 percent to 95 percent. The residue from the carbonylation treatment, which contains substantially all the copper, cobalt and sulfur from the drastically quenched material, is then treated by the first stage leaching operation under the conditions specified hereinbefore.

The residue from the first stage leaching operation is subjected to an oxidative leaching treatment to dissolve substantially all the copper as copper sulfate and to liberate elemental sulfur, which is a preferred commercial form of sulfur. The oxidative leaching treatment with a lixiviant, which contains at least about 2 g.p.l. of iron as iron sulfate and sulfuric acid in amounts at least stoichiometrically equivalent to the copper in the residue, is advantageously conducted in an autoclave at a temperature between about 100° C. and 125° C. with partial pressures of oxygen between about 5 atms. and 15 atms. Advantageously, sulfuric acid is employed in excess stoichiometric amounts of up to about 20 percent, e.g., about 10 percent. The iron content in the acidic aqueous solution is advantageously controlled to provide iron concentrations between about 4 g.p.l. and 10 g.p.l. At lower iron concentrations the rate of reaction is quite low and, as the iron concentration increases, the reaction proceeds much more rapidly. However, it is preferred to limit the iron concentration to below about 10 g.p.l., in order to minimize the difficulties encountered by the presence of iron in the pregnant copper sulfate solution when recovering copper therefrom, whether by electrolytic means, hydroxide or carbonate precipitation or precipitation by hydrogen reduction. An important feature of the present invention is to provide an iron concentration of at least about 2 g.p.l., which can be either in the ferrous or ferric stage since under the oxidative leaching conditions ferrous iron will be oxidized to ferric iron, in order to insure the liberation of elemental sulfur. The prior art has not recognized the importance of providing ferric ions during the oxidative leaching of nonferrous sulfides in order to produce elemental sulfur. For example, copper sulfide when slurried with stoichiometric amounts of sulfuric acid in a glass-lined stainless steel autoclave and heated to a temperature of 110° C. with an oxygen partial pressure of 10 atm. produced only a copper sulfate solution and no elemental sulfur whereas copper sulfide slurried with stoichiometric amounts of sulfuric acid and 5 g.p.l. of ferric iron produced a copper sulfate solution and liberated over 90 percent of the sulfur in the copper sulfide as elemental sulfur. The initial stages of the oxidative leaching operation are advantageously conducted at temperatures of about 110° C. since at higher temperatures the liberated elemental sulfur melts and wets, i.e., coats, the copper residue thereby hindering the leaching action of the solvent. When the starting material contains precious metals, i.e., gold, silver, and the platinum group metals, the precious metals will follow the copper residues up to oxidative leaching operation where the precious metals ultimately report in the elemental sulfur-containing residue.

The precious metals associated with the elemental sulfur can be further concentrated by melting and filtration. Elemental sulfur adhering to the precious metal concentrate can be burned off as sulfur dioxide in a free-oxygen-containing gas. The precious metal concentrate is then treated by conventional means such as sulfation with sulfuric acid to solubilize base metals such as copper so that upon leaching an even more concentrated precious metal residue is obtained which can be treated by recognized means to individually recover each of the precious metals present. Advantageously, sulfation of the precious metal concentrate is conducted at a temperature below about 170° C.

Another example of the use of the process in accordance with the present invention in conjunction with prior processing is the treatment of the copper-rich fraction obtained by slowly cooling a nickel-copper matte. Although the separation of nickel from copper by the matte separation process is highly selective, particularly insofar as the nickel-rich fraction is concerned, the copper-rich fraction frequently contains up to about 10 percent nickel. The copper-rich fraction is advantageously treated with a copper sulfate solution, as described hereinbefore, to produce a copper sulfide residue and a nickel sulfate solution from which nickel is recovered. The copper sulfide residue is then slurried with an acidic aqueous solution containing iron as iron sulfate in an amount of at least about 2 g.p.l. and sulfuric acid in an amount at least stoichiometrically equivalent to the copper in the copper sulfide residue. The slurry is heated to a temperature between about 80° C. and 125° C. under an oxygen partial pressure of at least about 2 atmospheres, e.g., about 5 atmospheres or higher, to produce elemental sulfur and a pregnant copper sulfate solution which can be treated to recover copper. Advantageously, a portion of the pregnant copper sulfate solution is recycled to the first stage leaching operation in amounts such that the copper in the pregnant solution is at least stoichiometrically equivalent to the nickel contained in the copper-rich fraction and the remainder of the pregnant copper sulfate solution is treated for copper recovery before recycling it to the second stage leaching operation.

The pregnant copper sulfate solution from the oxidative leaching is treated for recovery of copper. Advantageously, a portion of the pregnant copper sulfate solution is recycled to the first leaching operation in amounts such that copper sulfate requirements of the first stage leaching solution are fulfilled while the remainder of the pregnant solution is treated for copper recovery. Copper can be recovered from the pregnant solution by cementation or by alkali precipitation, but such recovery techniques entail further processing to recover copper in commercial forms or the addition of reagents. It is possible to recover the copper from the solution by electrowinning or by hydrogen reduction techniques. Advantageously, the copper is recovered by electrowinning. The electrowinning of copper from solution is conducted so that about 40 percent to 80 percent, advantageously about 60 percent to 70 percent, of the copper in solution is recovered as electrolytic copper. The spent electrolyte advantageously contains about 30 g.p.l. to 40 g.p.l. copper as cupric sulfate, about 4 g.p.l. to 10 g.p.l. liter of iron as iron sulfate and about 150 g.p.l. free sulfuric acid. The spent electrolyte is recycled to the second stage leaching, i.e., oxidative leaching, operation. If the iron concentration in the spent electrolyte is insufficient to provide a ferric ion concentration in the second stage leaching operation to produce elemental sulfur, additional iron can be added to the autoclave. The recirculation of the electrolyte to the oxidative leaching stage provides a substantially closed circuit which eliminates the necessity of providing fresh lixiviants thereby substantially lowering water requirements and avoiding problems associated with water pollution.

The nickel sulfate solution obtained from the first stage leaching operation is treated to recover nickel and cobalt in commercially acceptable forms. The nickel sulfate solution, which contains iron dissolved from the starting material and from the iron contained in the pregnant solution from the second stage leaching operation, is first treated to eliminate iron. Iron can be removed from the solution as ferric hydroxide by the addition of a base such as calcium hydroxide while oxidizing the solution with air. Of course, iron can be removed by any other known means. Copper, which is present in the nickel sulfate solution due primarily to the use of excess stoichiometric amounts of copper sulfate in the first stage leaching operation, can be removed from the solution after iron removal by electrolytic means, hydrogen sulfide precipitation, precipitation by selective hydrogen reduction or by ion exchange techniques including liquid-liquid extraction. If the nickel sulfate solution contains cobalt, cobalt is recovered by oxidation and precipitation with a base such as sodium hydroxide or by ion exchange techniques. Advantageously, cobalt is first removed as cobaltic hydroxide, which after being redissolved in hydrochloric acid is treated by ion exchange processes to recover a pure form of cobalt. The thus-purified nickel sulfate solution can then be treated to recover nickel. For example, sodium carbonate is added to the solution to precipitate nickel carbonate, which is usable as such or which can be calcined to nickel oxide.

For the purpose of giving those skilled in the art a better understanding of the invention and/or a better appreciation of the advantages of the invention, the following illustrative examples are given:

EXAMPLE I

A nickel-copper matte having a nickel to copper ratio of 1:5.1 was blown to a copper to sulfur ratio of 3.7:1 and was drastically quenched by granulation to provide a partially metallized material. The granulated metallized material was ground to pass through a 200 mesh screen (Tyler Series). Nickel, cobalt and iron were selectively leached from the metallized material by metathesis as a slurry of 40 percent solids by weight with an acidic aqueous solution of copper sulfate in a glass-lined stainless steel autoclave, which was provided with an agitator for increasing liquid-solid contact, for 2 hours at 200° C. The acidic aqueous solution contained a stoichiometric excess of copper sulfate of more than 10 percent and sufficient sulfuric acid to maintain the solution at a pH below 5. The results of the metathesis leaching are given in table I, and it is to be noted that the resulting residue contained only 0.17 percent iron and substantially all the copper in both the copper sulfate solution and the granulated matte and had a copper to sulfur ratio of about 4.4:1.

After filtration, the residue was slurried with a second acidic aqueous solution at 10 percent solids by weight. The acidic aqueous solution contained 150.2 g.p.l. sulfuric acid and 5.9 g.p.l. iron as iron sulfate and was a spent electrolyte from previous electrowinning of copper sulfate from an oxidative leach solution solution. The sulfuric acid was more than about 10 percent in excess of that amount stoichiometrically required to react with the copper in the residue. The slurry was heated to a temperature of 105° C. under an oxygen partial pressure of 10 atms. for 1.5 hours in a glass-lined stainless steel autoclave, which was provided with a stirrer to promote gas-liquid-solid contact. The results of this oxidative leaching test are reported in table I. It will be noted that 92 percent of the sulfur in the quenched matte was recovered as elemental sulfur.

TABLE I

| Sample | Weight, gms. or vol., ml. | Analysis wt./percent or gpi [1] | | | | | Distribution percent | | | | |
|---|---|---|---|---|---|---|---|---|---|---|---|
| | | Cu | Ni | Co | Fe | S | Cu | Ni | Co | Fe | S |
| Partially metallized material | 100 | 67.1 | 13.2 | 0.24 | 0.46 | 18.0 | 100 | 100 | 100 | 100 | 100 |
| CuSO₄ solution | 150 | 92.9 | 7.6 | 0.30 | 5.0 | [2] 9.8 | 20.8 | 8.6 | 18.8 | 163 | ........ |
| Metathesis leach residue | 99.9 | 79.4 | 0.55 | 0.04 | 0.17 | 18.0 | 118.2 | 4.2 | 17.0 | 36.9 | 100 |
| Pregnant solution | 150 | 11.5 | 92.0 | 1.6 | 6.9 | [2] 0.3 | 2.6 | 104.5 | 100 | 225 | ........ |
| Barren electrolyte | 900 | 28.7 | 10.2 | 0.16 | 5.9 | [2] 150.2 | 38.5 | 69.5 | 60.0 | 1,154 | ........ |
| Final residue | 14.2 | 8.3 | 0.08 | 0.01 | 0.11 | [3] 89.9 | 2.3 | 0.1 | 0.8 | 4.6 | [4] 96 |
| Pregnant solution | 900 | 114.7 | 10.7 | 0.20 | 6.1 | [2] 14.2 | 155.5 | 73.6 | 76.2 | 1,186 | ........ |

[1] Solids are given in weight percent and solutions in grams per liter.
[2] gpl H₂SO₄.
[3] 85.7% elemental sulfur.
[4] 92% as elemental sulfur.

EXAMPLE II

A 1,500 pound lot of a material containing copper, nickel and sulfur was top blown in a rotary oxygen converter to a sulfur content of 4.9 percent and was granulated. The drastically quenched product contained 19.6 percent copper, 70.5 percent nickel, 1.96 percent iron, 0.86 percent cobalt and 4.12 percent sulfur, e.g., a copper to sulfur ratio of about 4.75:1. The drastically quenched product was carbonylated under a partial pressure of carbon monoxide of 10 atmospheres to extract 96.9 percent of the nickel as a substantially pure nickel carbonyl and to provide a carbonylation residue which contained substantially all the copper, cobalt, iron and sulfur. Nickel, iron and cobalt were selectively leached by metathesis with an acidic aqueous solution as a slurry of 25 percent solids at a temperature of 180° C. for 2 hours. The acidic aqueous solution contained copper sulfate in a stoichiometric excess of about 8 percent of that required to react with all the nickel, cobalt and iron in the carbonylation residue and sufficient sulfuric acid to maintain the pH below about 5. The residue from the metathesis leach, which contained copper and sulfur in a ratio of about 5.5:1, was subjected to an oxidative leach to provide a pregnant copper sulfate solution and to produce elemental sulfur. The oxidative leach was accomplished with a slurry of about 10 percent solids by weight in an acidic aqueous solution at a temperature of 105° C. under an oxygen partial pressure of 10 atmospheres for 1.5 hours. The acidic aqueous solution contained 5 grams per liter iron as iron sulfate and sufficient sulfuric acid to react with at least all of the copper contained in the metathesis leach residue. The results of this example are reported in table II.

rich fraction containing 5.88 percent nickel was recovered by selective flotation. The copper-rich fraction had a copper to sulfur ratio of about 3.56 to 1. The nickel was selectively leached as a slurry of 50 percent solids, by weight, with an acidic aqueous solution at a temperature of 200° C. for 2 hours. The acidic aqueous solution contained copper sulfate in an amount stoichiometrically in excess of that required to react all the nickel, cobalt and iron contained in the copper-rich fraction and contained sufficient sulfuric acid to maintain the pH of the acidic aqueous solution below about 5. The metathesis leach produced a nickel sulfate solution and a residue containing substantially all the copper in the copper-rich fraction and in the acidic aqueous solution. The metathesis leach residue was slurried in a second acidic aqueous solution at 10 percent solids by weight. The second acidic aqueous solution contained 5.9 g.p.l. iron as iron sulfate and sulfuric acid in an amount stoichiometrically in excess of that required to react with all of the copper contained in the metathesis leach residue. The slurry was heated to a temperature of 105° C. under an oxygen partial pressure of 10 atmospheres to produce a pregnant copper sulfate and elemental sulfur. It will be noted that 90 percent sulfur was recovered as elemental sulfur. The results of this example are reported in table III.

TABLE III

| Sample | Weight, gms. | Analysis percent [1] | | | | | Distribution percent | | | | |
|---|---|---|---|---|---|---|---|---|---|---|---|
| | | Cu | Ni | Co | Fe | S | Cu | Ni | Co | Fe | S |
| Copper-rich fraction | 100 | 70.3 | 5.88 | 0.088 | 0.58 | 19.7 | 100 | 100 | 100 | 100 | 100 |
| Metathesis leach residue | 96 | 76.8 | 0.10 | 0.01 | 0.58 | 20.3 | 104 | 1.6 | 11.0 | 96 | 99 |
| Oxidative leach residue | 19.2 | 4.3 | 0.08 | 0.01 | 0.11 | [2] 94.0 | 1.2 | 0.25 | 2.2 | 3.6 | [3] 92 |

[1] Solids are given in weight percent.
[2] 92.8% of which was elemental sulfur.
[3] 90% of the sulfur contained in copper-rich fraction was recovered as elemental sulfur.

It is to be observed that the present invention provides a process for recovering at least about 80 percent elemental sulfur (advantageously more than about 90 percent and even up to 100 percent from a substantially iron-free sulfide of a metal selected from the group consisting of nickel and copper by oxidatively leaching the sulfide with an aqueous sulfuric acid-iron sulfate leach solution containing at least about 2 g.p.l.

TABLE II

| Sample | Weight, gms. or vol., ml. | Assay percent or gpl [1] | | | | | Distribution percent | | | | |
|---|---|---|---|---|---|---|---|---|---|---|---|
| | | Cu | Ni | Co | Fe | S | Cu | Ni | Co | Fe | S |
| Pressure carbonyl residue | 100 | 59-9 | 7.83 | 5.20 | 4.45 | 13.5 | 100 | 100 | 100 | 100 | 100 |
| CuSO₄ solution | 300 | 59.1 | 2.41 | 0.48 | 2.41 | [2] 13.7 | 29.6 | 9.20 | 2.80 | 16.2 | ........ |
| Leach residue | 96.7 | 77.6 | 0.43 | 0.09 | 1.17 | 14.0 | 125.9 | 5.39 | 1.7 | 25.4 | 100 |
| Pregnant solution | 300 | 7.4 | 27.1 | 17.5 | 13.5 | ........ | 3.7 | 103.9 | 101.1 | 90.8 | ........ |
| Dilute sulfuric acid | 900 | | | | 5.0 | | | | | 86.5 | ........ |
| Final residue | 16.2 | 2.9 | 0.50 | 0.05 | 0.66 | 82.0 | 0.78 | 1.03 | 0.16 | 2.40 | 98.4 |
| Pregnant solution | 900 | 82.7 | 0.37 | 0.07 | 5.4 | ........ | 124 | 4.28 | 1.50 | 109.5 | ........ |

[1] Solids are given in weight percent and solutions in grams per liter.
[2] gpl H₂SO₄.

EXAMPLE III

A nickel-copper matte was slowly cooled and the copper-iron and sulfuric acid at least stoichiometrically equivalent to the metal in the sulfide and heating the metal sulfide and the acidic aqueous solution to a temperature between about 80° C. and 150° C., advantageously between about 80° C. and 125° C. and even more advantageously between about 100° C. and 110° C., under a partial pressure of oxygen of at least about 2 atms. to provide a metal sulfate solution and to liberate elemental sulfur. It is to be understood that the term "substantially iron-free sulfide" as used herein refers to a sulfide that contains iron in insufficient amounts to provide the required concentration of iron in the acidic aqueous solution or a sulfide that contains iron in such a form that the iron will not be brought into solution. Furthermore, it is to be understood that all percentages and ratios given herein are taken on a weight basis unless otherwise stated.

It is to be further observed that the process in accordance with the present invention can be employed to recover nickel, copper and sulfur from materials containing the same by employing a two-stage leaching process. The first stage leaching operation is accomplished by metathesis with a copper sulfate solution in order to provide a metathesis leach solution containing nickel and a substantially iron-free metathesis leach residue containing substantially all the copper in the starting material. The second stage leaching operation is an oxidative leaching operation which produces a pregnant copper sulfate solution from which copper can be recovered and elemental sulfur. Nickel is recovered from the nickel-containing metathesis leach solution. In forming the slurry for the metathesis leach, the amount of solids incorporated in the slurry is limited only by the capacity of the apparatus being employed. Most generally, the metathesis leach slurry will contain between about 25 percent and 50 percent solids by weight. The slurry formed for the oxidative leaching operation will usually contain between about 5 percent and 25 percent solids by weight.

The process of the present invention is not to be confused with prior processes which employ oxidative leaching since such prior processes did not teach the necessity of providing a minimum concentration of iron in solution together with controlled amounts of sulfuric acid to produce elemental sulfur from substantially iron-free nickel and/or copper sulfides. For example, McKechnie at a very early date employed oxidative leaching techniques in treating nickel- and/or copper-containing sulfide materials but did not disclose the necessity of employing both an iron-containing and sulfuric acid containing leach solution. At a much later date, Forward, Nashner, Mc-Gauley and others employed oxidative leaching techniques for treating both ferrous and nonferrous materials. These later workers did not appreciate the necessity of providing both iron in solution and sulfuric acid in controlled amounts when treating substantially iron-free sulfides of copper and nickel to produce elemental sulfur.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for treating substantially iron free sulfides of at least one metal selected from the group consisting of nickel and copper to produce a sulfate solution of the metal and to liberate elemental sulfur which comprises slurrying the metal sulfide in an aqueous sulfuric acid-iron sulfate leach solution containing at least about 2 g.p.l. iron and sulfuric acid at least stoichiometrically equivalent to the metal in the sulfide and heating the slurry to a temperature between about 80° C. and 150° C. under an oxygen partial pressure of at least about 2 atms. to form a pregnant sulfate solution of the metal and to liberate elemental sulfur.

2. A process as described in claim 1 wherein the metal sulfide is copper and copper is recovered from the pregnant sulfate solution by electrowinning.

3. A process as described in claim 2 wherein the electrowinning treatment produces a spent electrolyte which is recycled to form the acidic aqueous leach solution.

4. A process as described in claim 1 wherein an oxygen partial pressure of at least about 5 atms. is employed.

5. A process as described in claim 1 wherein sulfuric acid is employed in excess stoichiometric amounts of up to about 20 percent.

6. A process as described in claim 1 wherein copper is recovered from the pregnant copper sulfate solution by cementation.

7. A process as described in claim 1 wherein copper is recovered from the pregnant copper sulfate solution by alkali precipitation.

8. A process as described in claim 1 wherein copper is recovered from the pregnant copper sulfate solution by hydrogen reduction.

9. A process for recovering copper, nickel and sulfur from materials containing the same which comprises providing a starting material in the granulated, drastically quenched state and having a copper:sulfur ratio between about 3.5:1 and 10:1; slurrying the starting material in finely divided form with an acidic aqueous solution, which solution contains copper sulfate in amounts at least stoichiometrically equivalent to the nickel contained in the starting material and sufficient sulfuric acid to maintain the solution at a pH value below about 5; heating the slurry to a temperature between about 100° C. and 250° C. under pressures generated at these temperatures to leach nickel from the starting material by metathesis to thereby produce a metathesis leach solution containing nickel and a metathesis-leach residue containing substantially all the copper in the starting materials; recovering nickel from the metathesis-leach solution; slurrying the metathesis-leach residue with an acidic aqueous solution, an aqueous sulfuric acid-iron sulfate leach solution containing at least about 2 g.p.l. iron and sulfuric acid at least stoichiometrically equivalent to the copper in the metathesis-leach residue; heating the metathesis-leach-residue slurry to a temperature between about 80° C. and 150° C. under an oxygen partial pressure of at least about 2 atms. to form a pregnant copper sulfate solution and to liberate elemental sulfur; and recovering copper from the pregnant copper sulfate solution.

10. A process as described in claim 9 wherein the starting material contains cobalt and the precious metals, and the cobalt is recovered in the metathesis-leach solution containing nickel while the precious metals are recovered from the elemental sulfur.

11. A process as described in claim 9 wherein copper is recovered from the pregnant copper sulfate solution by electrowinning whereby a spent electrolyte is produced which spent electrolyte is employed in forming the slurry with the metathesis leach residue.

12. A process as described in claim 9 wherein a portion of the pregnant copper sulfate solution is employed in forming the slurry used in metathesis leach.

13. A process as described in claim 9 wherein a portion of the pregnant copper sulfate solution is recycled to the metathesis leach in sufficient quantities to satisfy the stoichiometric copper sulfate requirements.

14. A process as described in claim 9 wherein copper is recovered by electrowinning, and the resulting spent electrolyte is employed in forming the metathesis leach residue slurry.

15. A process as described in claim 9 wherein the aqueous sulfuric acid-iron sulfate leach solution contains between about 4 g.p.l. an 10 g.p.l. iron.

16. A process as described in claim 9 wherein an oxygen partial pressure between about 2 atms. and 20 atms. is employed.

17. A process as described in claim 9 wherein the metathesis-leach-residue slurry is heated to a temperature between about 80° C. and 125° C.

18. A process as described in claim 9 wherein the metathesis-leach-residue slurry is heated to a temperature between about 100° C. and 110° C.

atms. A process as described in claim 9 wherein oxygen, partial pressures of at least about 5 atms. are employed.

20. A process for recovering nickel, copper and sulfur from materials containing the same which comprises providing a starting material in the drastically quenched state and having a nickel to copper ratio greater than about 1:2 and a copper to sulfur ratio greater than about 4:1; treating the drastically quenched material with carbon monoxide partial pressures at least about 5 atms. and less than about 100 atms. at a temperature between about 50° C. and 200° C. to form substantially pure nickel carbonyl and to provide a carbonylation residue; forming a slurry of the carbonylation residue with an acidic aqueous solution, which solution contains copper sulfate in amounts at least about stoichiometrically equivalent to the nickel contained in the carbonylation residue and sulfuric acid in amounts sufficient to maintain the solution at a pH value below about 5; heating the carbonylation residue slurry to a temperature between about 100° C. and 250° C. to leach the nickel therefrom by metathesis, to thereby produce a metathesis-leach solution containing nickel and a metathesis-leach-residue containing substantially all the copper; recovering nickel from the metathesis-leach solution; forming a slurry of the metathesis-leach-residue with an aqueous sulfuric acid-iron sulfate leach solution containing at least about 2 g.p.l. iron and sulfuric acid at least stoichiometrically equivalent to the copper in the metathesis-leach-residue; heating the metathesis-leach-residue slurry to a temperature between about 80° C. and 150° C. under oxygen partial pressures of at least about 2 atms. to produce a pregnant copper sulfate solution and to liberate elemental sulfur and recovering copper from the pregnant copper sulfates.

21. A process for treating a copper-rich fraction of copper sulfide obtained from a slowly cooled nickel-copper matte to recover copper, nickel and sulfur which comprises forming a slurry of the copper-rich fraction with an acidic aqueous solution, which solution contains copper sulfate in amounts at least about stoichiometrically equivalent to the nickel contained in the copper-rich fraction and sufficient sulfuric acid to maintain the solution at a pH value below about 5; heating the copper-rich slurry to a temperature between about 100° C. and 250° C. to leach nickel from the copper-rich fraction by metathesis to thereby produce a metathesis-leach solution containing nickel and a metathesis-leach-residue containing substantially all the copper; recovering nickel from the metathesis leach solution; forming a slurry of the metathesis-leach-residue with an aqueous sulfuric acid-iron sulfate leach solution containing at least about 2 g.p.l. iron and sulfuric acid at least stoichiometrically equivalent to the copper in the metathesis-leach-residue; heating the metathesis-leach-residue slurry to a temperature between about 80° C. and 150° C. under oxygen partial pressures of at least about two atmospheres to produce a pregnant copper sulfate solution and to liberate elemental sulfur; and recovering copper from the pregnant copper sulfates.

22. A process as described in claim 21 wherein the copper-rich fraction contains cobalt and the precious metals, and cobalt is recovered from the metathesis-leach solution containing nickel while the precious metals are recovered from the elemental sulfur.

* * * * *